United States Patent [19]

Murakami et al.

[11] Patent Number: 4,855,037
[45] Date of Patent: Aug. 8, 1989

[54] HYDROGENATION CATALYST FOR COAL TAR, A METHOD OF HYDROGENATION OF COAL TAR WITH USE OF SUCH CATALYST, AND A METHOD OF PRODUCING SUPER NEEDLE COKE FROM THE HYDROGENATION PRODUCT OF COAL TAR

[75] Inventors: Tadashi Murakami, Yokohama; Mikio Nakaniwa; Yoshio Nakayama, both of Tokyo; Mitsuaki Masuo, Yokohama, all of Japan

[73] Assignee: Nippon Kokan Kabushiki Kaisha, Tokyo, Japan

[21] Appl. No.: 149,942

[22] Filed: Jan. 28, 1988

Related U.S. Application Data

[60] Continuation of Ser. No. 867,545, May 28, 1986, abandoned, which is a division of Ser. No. 773,130, Sep. 6, 1985, abandoned.

[30] Foreign Application Priority Data

Sep. 12, 1984 [JP] Japan .................. 59-189493
Oct. 19, 1984 [JP] Japan .................. 59-218697

[51] Int. Cl.$^4$ .......................... C10G 1/08; C10G 1/06
[52] U.S. Cl. ...................................... 208/422; 208/419
[58] Field of Search ................................ 208/422, 419

[56] References Cited

U.S. PATENT DOCUMENTS

| | | | |
|---|---|---|---|
| 3,944,503 | 3/1976 | Suto et al. | 252/455 R |
| 4,051,021 | 9/1977 | Hamner | 208/216 |
| 4,062,809 | 12/1977 | Ward | 252/455 R |
| 4,066,574 | 1/1978 | Tamm | 252/439 |
| 4,081,405 | 3/1978 | Sawyer | 252/455 R |
| 4,081,406 | 3/1978 | Sawyer | 252/455 R |
| 4,082,695 | 4/1978 | Rosinski et al. | 252/465 |
| 4,108,761 | 8/1978 | Sze et al. | 208/254 H |
| 4,113,656 | 9/1978 | Riley et al. | 252/439 |
| 4,119,531 | 10/1978 | Hopkins et al. | 208/251 H |
| 4,134,856 | 1/1979 | Itoh et al. | 252/439 |
| 4,162,962 | 7/1979 | Stangeland | 208/58 |
| 4,181,602 | 1/1980 | Quick et al. | 208/216 PP |
| 4,297,242 | 10/1981 | Hensley, Jr. et al. | 252/439 |
| 4,324,645 | 4/1982 | Angevine et al. | 208/50 |
| 4,328,127 | 5/1982 | Angevine et al. | 252/439 |
| 4,357,263 | 11/1982 | Heck et al. | 252/439 |
| 4,455,390 | 6/1984 | Ting et al. | 502/314 |
| 4,518,709 | 5/1985 | Pellet | 502/254 |

FOREIGN PATENT DOCUMENTS

| | | |
|---|---|---|
| 49-11442 | 3/1974 | Japan . |
| 51-41129 | 11/1976 | Japan . |
| 52-28501 | 3/1977 | Japan . |
| 52-78201 | 7/1977 | Japan . |
| 57-198788 | 12/1982 | Japan . |
| 59-122585 | 7/1984 | Japan . |

Primary Examiner—Patrick P. Garvin
Assistant Examiner—George R. Fourson
Attorney, Agent, or Firm—Fleit, Jacobson, Cohn & Price

[57] ABSTRACT

Described is a catalyst used for hydrogen treatment of coal tar characterized in that about 10 to 30 weight percent of Mo oxides as first catalyst component and about 1 to 6 weight percent of Ni and/or Co as second catalyst component, both relates to the total catalyst weight, are supported on a porous inorganic substrate consisting essentially of alumina or silica alumina, and in that the mean pore size is about 8 to 18 nm, the pore size distribution is such that

| pore size nm | volume ratio cc/g |
|---|---|
| 3.5-5 | Less than 0.1 |
| 5-8 | Less than 0.3 |
| 8-18 | 0.2-0.2 |
| 18-30 | Less than 0.2 |
| over 30 | Less than 0.1 | and the total pore surface is higher than about 100 m$^2$/g. Also described are the method of hydrogen treatment with use of the catalyst, and the method of producing a super needle coke suitable for the preparation of the graphite electrode, which consists in subjecting the hydrogenated oil resulting from such hydrogen treatment to delayed coking.

1 Claim, 5 Drawing Sheets

HYDROGENATION CATALYST FOR COAL TAR, A METHOD OF HYDROGENATION OF COAL TAR WITH USE OF SUCH CATALYST, AND A METHOD OF PRODUCING SUPER NEEDLE COKE FROM THE HYDROGENATION PRODUCT OF COAL TAR

This application is a continuation application under 37 C.F.R. 1.62 of prior application Ser. No. 867,545, filed on May 28, 1986, now abandoned, entitled Hydrogenation Catalyst for Coal Tar, a Method of Hydrogenation of Coal Tar with Use of Such Catalyst, and a Method of Producing Super Needle Coke from the Hydrogenation Product of Coal Tar, which is a Rule 60 divisional of appln. Ser. No. 773,130, filed Sept. 6, 1985, now abandoned.

BACKGROUND OF THE INVENTION

1. Field of the Invention

This invention relates to a catalyst for hydrogenation of coal tar (hereinafter referred to as CT), coal tar pitch separated from CT (hereinafter referred to as CP), or heavier oil derived from coal sources or the like, the method of hydrogenation with use of such catalyst, and the method of producing high quality needle coke (hereinafter referred to as N-coke), or super needle coke (hereinafter referred to as SN-coke), from the hydrogenation product.

2. Description of the Prior Art

The art of hydrogenation of CT for the preparation of the high valued material from such hydrogenation product, such as coke required for the manufacture of graphite electrodes that may have a good performance under the quick melt conditions of the ultra high power (UHP) operation of the electrical furnaces, is already shown in the Japanese Laid-Open Patent Publication No. 122585/1984.

The art for improving the de-nitrogenation of the starting material derived from CT by the catalyst composed with various kinds of metal is described for example in the Japanese Laid Open Patent Publication.

However, there are no descriptions concerning the poisoning to the catalyst by the basic nitrogen compounds such as pyridine, quinoline or acrydine, which must necessarily be taken into consideration when using the starting materials derived from CT. Thus one may feel anxious about whether the stable catalytic action may be maintained during the operation over an extended time.

As the method of hydrogen treatment of the pitch-like material, it is also described about the catalyst which inhibit hydro-decomposition of the aromatic nuclei themselves in it to a lesser extent but selectively decompose the condensed aromatic hydrocarbons into a low molecular weight products (Japanese Laid-Open Patent Publication No. 198788/1982). Accordingly, this case may be specific in that there occurs no hydrogenation for CT as the medium of pitch like material.

The carbon material generally prepared by coking the starting coking material usually at the coking temperature range of 430° to 470° C. or thereabouts, known as raw needle coke (N-coke) or green needle coke (green N-coke) is composed of aggregates of graphite-like fine crystallites of hexagonal system with the mean size of the order of 1 nm. The properties of the N-coke required for the preparation of the high-quality graphite electrodes are dependent in a known manner on the orientation of and the binding force acting on these crystallites.

The formation of these crystallites are markedly affected in a known manner by the state of generation of the optically anisotropic mesophase spherules from which bulk mesophased are formed by coalescence of spherules and growth thereof finally resulting in the coke precursors upon heating the starting coking material.

On the other hand, the mesophase spherules are affected by such factors as the composition of the starting coking material, impurties that obstruct the growth of the mesophase spherules, and the coking conditions, so that it is by no means easy to specify the unique condition and structure for obtaining of the high quality N-coke.

Therefore, the essential conditions for the preparation of the high grade N-coke usable for the preparation of the graphite electrode usable for the purpose of UHP operation are the meticulous sorting or selection and the refining of the starting coking material.

For example, it is described in the Japanese Patent Publication No. 78201/1977 to separate or eliminate quinoline insolubles (QI) out of CP through the selection of the ratio of the aromatic solvents mixed with CP and being coked the resulting material by the conventional delayed coking to the N-coke. It is described in the Japanese Laid-Open Patent Publication No. 28501/1977 to eliminate the QI components out of the hydrocarbon material containing said QI components and the condensed cyclic hydrocarbon compounds by using a solvent the 95 volume percent (ASTM) of which has the boiling point lower than 330° C. and the BMCI value of which is in the range of 5 to 70, then to remove the solvent and being coked the resulting product by conventional delayed coking to the desired N-coke.

It should be noted that the methods described in these two publications are intended for QI removal. When the starting coking material prepared by these two methods are used for coke manufacture it is possible to obtain the premium grade N-coke (PN-coke) in terms of CTE, however, swelling or puffing phenomena are undesirably observed in the preparation of graphite electrodes in accordance with the Lengthwise Graphitization System (LWG-system).

Such puffing phenomena is also seen to occur with the N-coke which is of substantially the same grade as that obtained from the starting coking material derived from petroleum sources. In the case of petroleum coke, however, such puffing is mainly ascribable to the sulphur contained in the coke and, in general, may easily be controlled by the addition of iron oxides as anti-puffing agent.

It is also known that the graphite electrode from the PN-coke manufactured from the material derived from coal sources is excellent in mechanical strength but slightly inferior in tenacity to the similar product derived from petroleum sources.

Although the reason for these defects is not known precisely, it is generally thought that both the desorbed gases from hetero atoms contained in the coke such as N, O or S and the texture of the carbon material are playing some part in the course of the graphitization of the electrodes.

Thus it may be surmised that the effect of certain ingredients may become predominant in QI free CT(QIF-CT) or QI free CP(QIF-CP) which favour the formation and growth of the good quality mesophase under a lower coking temperature while simultaneously allowing for development of the mesophase into the bulk mesophase with fibrous texture, but which obstruct generation of the bulk mesophase with fibrous texture when the coking temperature is increased, the coking speed of the ingredients in the QIF-CP or QIF-CT then becoming higher.

There is described in the Japanese Patent Publication No. 11442/1974 the method of modifying the CP by hydrogenation to a starting pitch material having a chemical structure likely to produce easily graphitizable needle coke. However, it is not possible to prepare the SN-coke even if the material produced in this manner is used as such as the starting coking material.

In the Japanese Patent Publication No. 41129/1976, there is described the method for the preparation of the pitch coke form the tar pitch derived from petroleum sources and that derived from coal sources. According to this method, the starting tar pitch is alkylated and thereafter modified in the presence of the hydrogenation catalyst.

However, by these methods, the QI components are still contained in the starting coking material, so that it is not possible to obtain the starting coking material for SN-coke schemed to provide by the present invention.

In general, the rate or reaction speed in the catalytic hydrogenation of various materials including QIF-CT or QIF-CP is determined to some extent by the diffusion of reactants into the catalyst pores.

From the above it will be appreciated that the larger pore size is effective to promote dispersion of the reactants into the active points in the pores. On the other hand, the larger is the pore size of the catalyst, the lesser becomes the active surface areas of the pore, so that the overall reaction speed is unavoidably lowered.

Also, with an oil with high asphaltenes contents and high aromaticity (fa) such as CT, the inside space of the pore is gradually occluded with the precipitated carbonaceous material, as the result of that the diffusion capacity into the pores is further lowered so that the desired effect at the initial stage of the catalyst is not expected to continue for any prolonged time.

As a means of increasing the active surface of the catalyst having a larger pore size, it may be feasible in principle to increase the pore volume. However, such increase in the pore volume results in declining the performance in strength of the catalyst thus causing breakage during catalyst charging into the reactor or powdering due to wear caused during operation so that industrial application may occasionally become an impossibility.

SUMMARY OF THE INVENTION

It is a principal object of the present invention to provide the CT which is the starting material for the preparation of the coke that is homogeneous, low in electrical resistivity, CTE and modulus of elasticity, a catalyst for hydrogen treatment, the method of treatment or processing using such catalyst, and the manufacture of CT from the resulting hydrogenated oil.

For obviating the aforementioned problems, the present inventors have conducted various investigations and research and arrived at the catalyst for hydrogen treatment of CT or CP and QIF-CT or QIF-CP wherein molybdenum (Mo) as first catalyst component and nickel (Ni) and/or cobalt (Co) as second catalyst component are supported on a porous inorganic oxide substrate consisting essentially of alumina or silica alumina, wherein about 10 to 30 weight percent of the first catalyst component as metal oxide and about 1 to 6 weight percent of the second component as metal oxide, both related to the total catalyst weight, are present and wherein the mean pore size is about 8 to 18 nm, the pore size distribution is such that

| pore size nm | specific volume cc/g |
| --- | --- |
| 3.5–5.0 | less than 0.1 |
| 5.0–8.0 | less than 0.3 |
| 8–10 | 0.2–0.5 |
| 18–30 | less than 0.2 |
| over 30 | less than 0.1 | and the total pore surface measure is higher than about 100 m$^2$/g, the method of hydrogen treatment of CT or CT and QIF-CT or QIF-CP with use of such catalyst and under specified hydrogenation conditions, and the preparation of SN-coke with of the material thus treated as the starting material.

More particularly, with the mean pore size of the catalyst being other than about 8 to 18 nm, for example, less than 8 nm, diffusion of the reactants into the pore becomes extremely difficult and the effective catalystic activity is lost because it is the rate of diffusion that determines the reaction rate. In addition, with use of an oil with high fa and high asphaltene contents, such as CT or CP and QIF-CT or QIF-CP, the pore size is reduced with precipitation and stacking of the carbonaceous material thus more strongly obstructing diffusion of the reactants into the pore, the pore space being occluded with the precipitated carbonaceous material.

On the other hand, while the mean pore size larger than 18 nm is sufficient for diffusion, the pore surface areas is reduced with increase in the pore size thus causing the lower hydrogenation activity per catalyst volume and protracting the time of residence in the pore of carbonaceous precursors, such as asphaltene, with the result that precipitation of the carbonaceous material onto the pore surface increased and the activity of the pore survace is lowered due to poisoning of the carbonaceous material.

For this reason and from the various experimental data, it is preferred that the specific volume of the catalyst with the pore size less than about 3.5 nm is less than about 0.1 cc/g and that with the pore size in the range or 5 to 8 nm is less than about 0.3 cc/g.

Referring to the catalyst of the larger pore size, it is preferred that the specific volume of the catalyst with the pore size in the range of about 18 to 30 nm is less than 0.2 cc/g, while that with the pore size larger than 30 nm is less than 0.1 cc/g.

It is preferred that the catalyst be able to continue to be sufficiently active in stability for a prolonged time, that is, that the catalyst can be used for about 4000 hours.

The value of the mean pore size in the context of the present invention is given by the following formula:

$$\text{mean pore size (nm)} = 4 \times PV \times 1/SA$$

wherein
PV represents the sum of the pore volume of the 3.5 nm pore per unit catalyst weight (cc/g), and
SA represents the sum of the surface of the 3.5 nm pore per unit catalyst weight (m$^2$/g).

The pore size, volume and surface given above were found with the use of an automatic porosimeter with the trade name of micromellitics autopore 9200 and by a mercury press-in method (see E. W. Washburn, Proc. Nat'l. Acad. Sci., vol. 7, 115 (1921); H. L. Ritter and L. E. Drake, Ind. Eng. Chem. Anal., vol 17, 782 to 787 (1945); L. C. Drake, Ind. Eng. Chem. vol. 41,780 (1949); H. P. grace, J. Amer. Inst. Chem. eng'rs. vol. 2, 307 (1956)).

In effect, measurement was made with the mercury surface tension ($\gamma$) of $4.8 \times 10^{-5}$ N/m (480 dyne/cm), the working contact angle ($\theta$) larger than 140 degrees and with the absolute mercury pressure being changed in the range of 0.098 to 412 MPa (1 to 4200 kg/cm$^2$A).

The pore size larger than 3.5 nm is given as $-4\gamma \cos \theta$/absolute mercury pressure.

The catalyst used in the present invention consists in one or more metals having hydride bonds and carried on a porous substrate containing alumina or silica alumina as main components.

The porous substrate may include various porous metal oxides consisting essentially of alumina, silica alumina, alumina zirconia and alumina titania, these being occasionally molded with clay materials as third component.

The metals with a hydrogenation activity may be selected from the group of metals including chromium, molybdenum, tungsten, iron, cobalt and nickel, etc. For instance, the catalyst may be comprised of Ni-Mo of Ni-Co carried on alumina.

In effect, nitrates, sulfates, chlorides, metal acid salts, complex salts or the like soluble metal salts compounds may be dissolved in suitable solvents such as water, methanol or acetone, carried on a substrate as by immersion, deposition, kneading or ion exchange, dried and baked as conventionally.

The catalyst obtained in this manner be pre-treated for obtaining a moderate catalytic activity.

When the fixed bed catalyst is used, QIF-CT or QIF-CP is preferably used as the starting material to prevent occlusion of the catalyst surface and the resulting premature deactivation. When the fluid bed system is used, no limitation is placed on the starting material, but any materials may be used without inconvenience.

The hydrogen treatment of CT is carried out at the reaction temperature of 300° to 420° C., a hydrogen pressure of 3.92 to 17.6 Mpa and a liquid hourly space velocity (LHSV) of 0.2 to 2.0 hr$^{-1}$.

The hydrogenated oil produced in this manner is fed into a tubular heating furnace at the outlet temperature of 470° to 520° C. under the pressure of, for example, 2.45 to 3.92 MPa, for effecting a thermal cracking reaction, whereby the lighter end as well as nonvolatile contents are removed from the thermal cracked oil. The residual material is subjected to a delayed coking under pressure and at 445° to 470° C. to give the desired coke.

The temperature at this time is critical if it is desired to produce the SN-coke, and should be determined in consideration of the content of the volatile combustible matter (VCM) of the raw coke and other factors such as CTE, mechanical strength and the young modulus. The temperature range is preferably 445° to 470° C. and more preferably 450° to 465° C.

The coking pressure of 0.196 to 0.98 MPa usually suffices, while the processing time is about 24 hours and occasionally about 36 hours.

More particularly, the hydrogenated oil is such produced as the nitrogen content thereof is reduced by more than 15 percent based on that of the original feed (hereinafter referred to as de-N ratio) and said hydrogenated oil is further subjected to thermal cracking in a tubular heating furnace at the outlet temperature of 470° to 520° C. under the pressure of less than 3.92 MPa and cold residence time of 60 to 360 seconds in such a manner that the heavy end of the hydrogenated oil are further thermal cracked and converted into lighter portions. Thermal cracked oil thus produced is then fed to a flashing column so as to flashed at the temperature up to 510° C. and under the pressure of 0.0049 to 0.294 MPa (0.05 to 3.0 kg/cm$^2$A). Thus the lighter ends of thermal cracked oil is removed off from the upper portion of the column, whereas the non volatile components boiling above 520° to 538° C. or more higher is removed from the bottom to give a middle cut from which the starting coking material is obtained with a high yield so as to be subjected to delayed coking.

The following results may be achieved upon practicing the present invention.

(i) The inventive catalysts are stable in service life and may remain active for a extended time at least longer than 4000 hours at higher than a present level.

(ii) The catalyst can be used for hydrogen treatment for the preparation of a partially or completely hydrogenated compounds contained in CT.

(iii) It is possible to maintain the coke CTE at the level comparable to that of the SN-coke and to carry out the operation at the coking temperature notably higher than the temperature at which the PN-coke is obtained from the conventional coal tar starting material. Hence, it becomes possible to achieve the desirable VCM content of the raw coke.

(iv) The anti-puffing effect much higher than that achievable with the method consisting solely of the hydrogenation can be achieved at the lower range of the de-N ratio.

(v) The above may lead to an improved overall homogeneity of the coke and to a more efficient method for the production of the coke.

DESCRIPTION OF THE PREFERRED EMBODIMENT

Example 1

The QIF-CP with the following properties was hydrogen treated with the use of eight different catalyst compositions shown in the Table as later described.

| Properties of QIF-CP | |
| --- | --- |
| Specific gravity, 15/4° C. | 1.2381 |
| Conradson carbon, wt. % | 38.5 |
| nC7 - I, wt. % | 19.3 |
| TI, wt. % | 9.06 |
| C, wt. % | 91.86 |
| H, wt. % | 4.93 |
| S, wt. % | 0.49 |
| N, wt. % | 1.13 | nC7-I: n-heptane insolubles; TI: Toluene insolubles

As a hydrogen treatment unit, a fixed catalyst bed devices was used. The device consists essentially of a stainless steel reaction tube with an inside diameter of 25 mm and a length of 1000 mm through which a thermowell with an outside diameter of 8 mm is passed centrally downwards and which is automatically controlled in pressure, temperature and flow rate.

The reactor is designed to be heated in a controlled manner by an aluminum block divided into six individually heated blocks.

The starting oil is metered by an integrating type flow meter and metered amounts of the oil are supplied into the reactor by a dual-type reciprocating pump. The gas-liquid flows as the parallel downward flow in the reactor.

The catalyst package is 200 cc with 30 cc each of the inactive alumina beads charged into the upper and lower parts of the catalyst stratum. The effluent from the reaction zone is introduced into the gas/liquid separator, the liquid is collected in a liquid product receiver cia pressure control valve, while the gas is conveyed through a pressure control valve, metered in a wet flowmeter and analyzed by process gas chromatography to be then discharged from the system.

The catalysts tabulated below are previously treated with Khafji oil having adjusted sulfur content of about 1 weight percent with the addition of di-tertiarybutyl-sulfide for about 24 hours 16 300° C., 13.72 MPa, LHSV equal to 1.0 $hr^{-1}$ and H/oil equal to 1000 N1/1.

Figure 1:
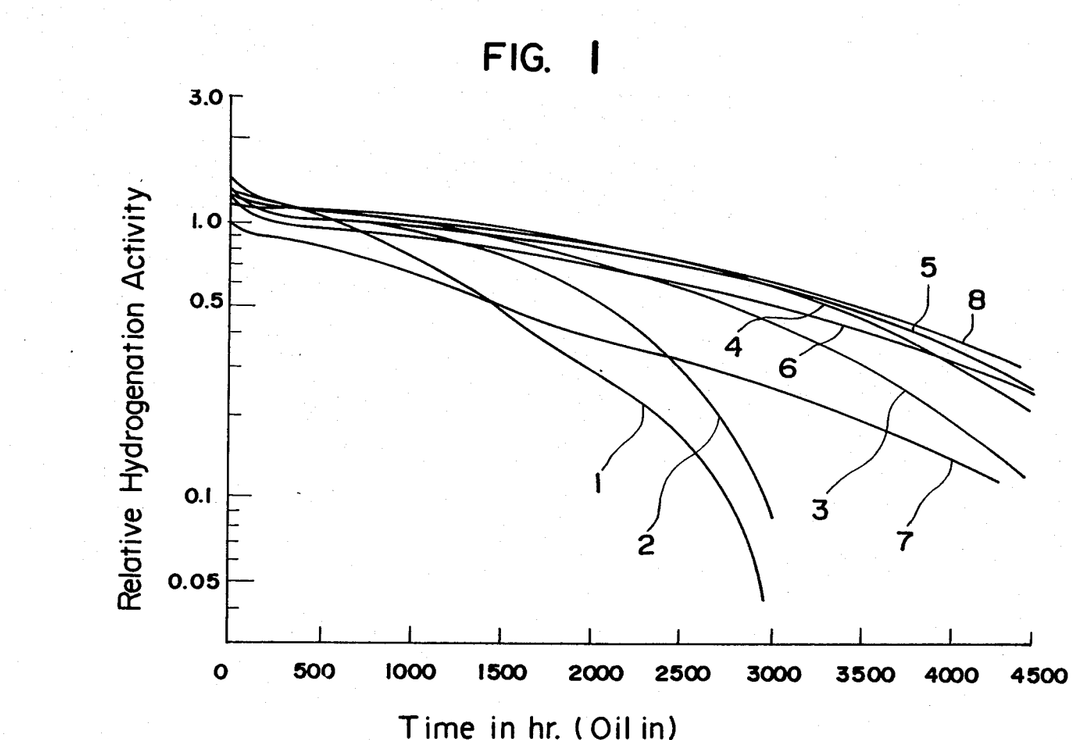
FIG. 1 shows the time dependence change in the relative hydrogenation activities of the catalysts with respect to Nos. 1, 2, 3, 4, 5, 6, 7 and 8 in the course of the hydrogenation of QIF-CP.
Figure 2:
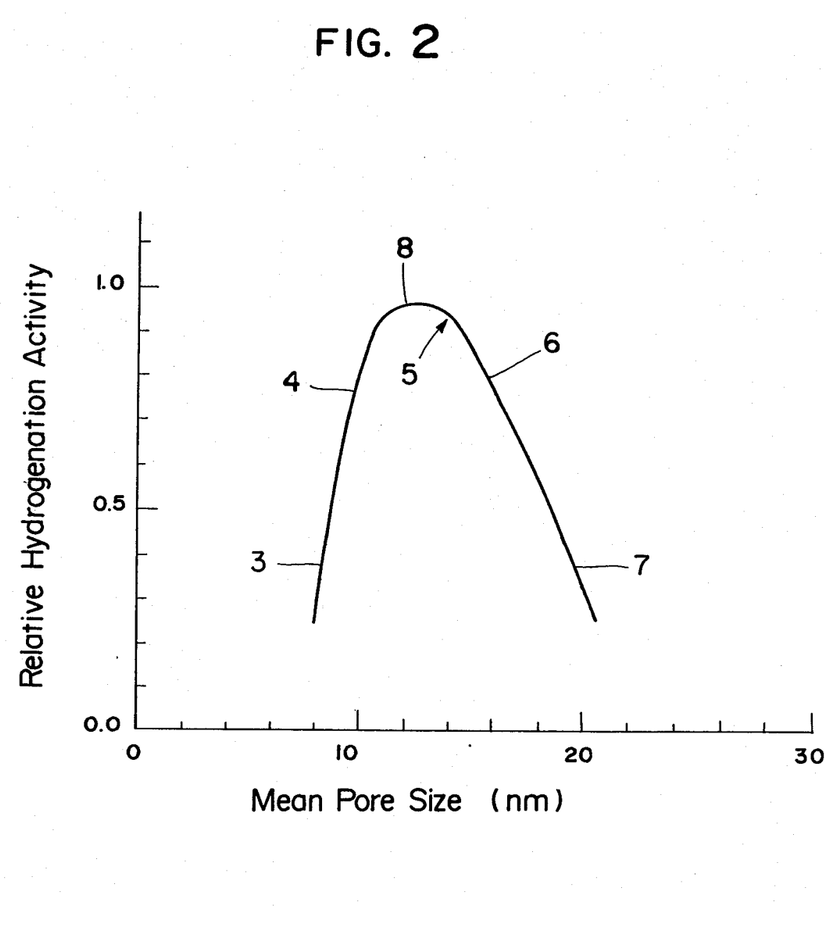
FIG. 2 shows the relationship between relative hydrogenation activity and mean pore size of the catalysts with respect to Nos. 3, 4, 5, 6, 7 and 8 at the total time of oil charge is 4000 hrs.

The catalyst thus sulfurized is used and the hydrogenation activity of the various catalysts are compared under the hydrogenation conditions of 360° C., 13.72 MPa (140 $kg/cm^2G$), LHSV=0.5 $hr^{-1}$, and H/oil=1000 N1/1. The results are shown in FIGS. 1 and 2.

The hydrogenation activity is expressed as a relative reaction rate (Kfa) calculated in accordance with the formula shown below. This expression is derived based on the assumption that the change in Aromaticity (fa) of the product to that of the starting oil in the course of hydrogenation obeys the first order kinetics. Aromaticity (fa) is regarded as the hydrogenation parameter and measured by proton NMR spectrum.

$$Kfa-OHSV \ln(fa, F/fa,P)$$

where (fa, F) denote the aromaticity of the starting oil and (fa, P) denote the aromaticity of the product oil.

The JNM-GX 270 type pulse Fourior transform proton nuclear magnetic resonance unit manufactured by Nippon Denshi K.K. was used as the proton NMR unit and the data processing was carried out by an enclosed electronic computer.

In actual measurements, concentration of samples were prepared to about 3 wt. % by using carbon disulfide as solvent. Tetramethylsilane (TMS) and 100% deutero chloroform were used as inner primary standard and as locking agent, respectively.

The measurement conditions were 270.05 MHz resonance frequency and 45° pulse (pulse width, 6.8 $\mu$sec.), 32K data points, observed spectrum width 4000 Hz, pulse width 3 sec., the number of integration times being 8 to 10 (see K. Mullen and P. S. Precosin, "Fourier Transform NMR Techniques, Academic Press. Inc. (London) Ltd. (1976), T. C. Farrar and E. D. Becker, "Pulse and Fourier Transform NMR", Academic Press Inc. (London) Ltd. (1971), for pulse Fourier transform proton NMR units).

The identification of various type of bonding hydrogens in the proton NMR spectrum was determined on the basis of the chemical shift ($\delta$) defined by the following formula $$\delta = (Hr - Hs)/Hr$$

Hr and Hs in the formula stand for the resonance frequency of the sample and that of TMS, respectively. Although the value $\delta$ itself is dimensionless, it is usually expressed as ppm because it stands for parts per million shift of the resonance frequency relative to the value of TMS being zero.

Figure 3:
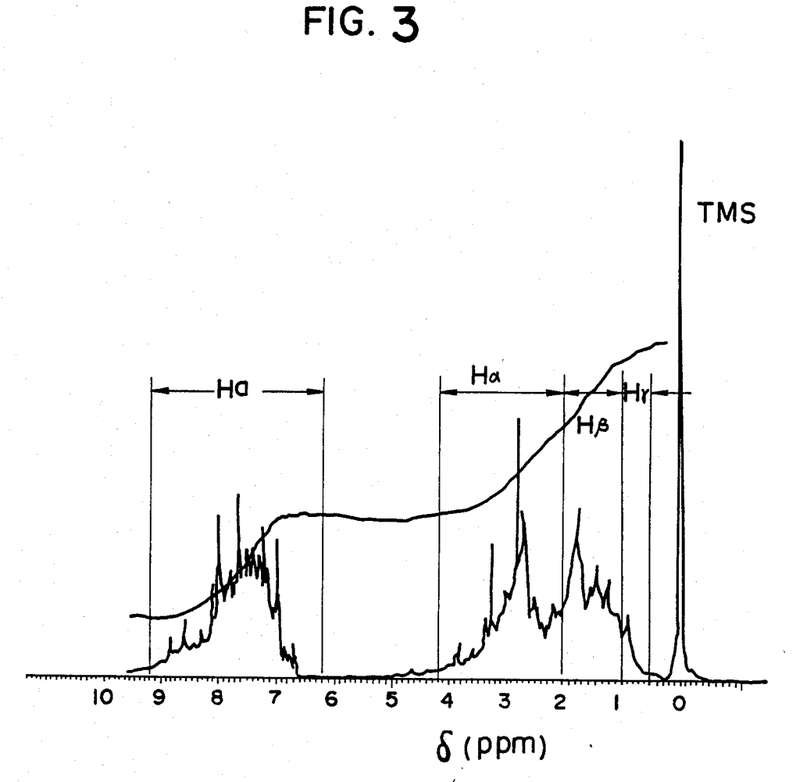
FIG. 3 shows the typical proton NMR spectrum of hydrogenated oil of QIF-CP.

FIG. 3 shows the typical example of the NMR spectrum of QIF-CP and the hydrogenated oil thereof, these oils being a mixture of numerous compounds centered by the condensed ring aromatic hydrocarbons and being sorted into the following four groups and each with the specific range of the $\delta$ value with respect to the various bonding modes of the hydrogens. According to the present invention, spectral positions of pure model substances are set on the basis of the Literature by K. D. Bartie et al (Fuel, vol. 44, 109 (1965); Fuel, vol. 54, 226 (1975); Chem. Ind., vol. 5,313 (1975); Anal. Chem. vol. 51,2189 (1979) and Maekawa et al, Nikkashi, No. 6,908(1980).

| Range of $\delta$ (ppm) | Symbol | Hydrogen Bonding |
| --- | --- | --- |
| 0.5–1.0 | H$\gamma$ | Terminal methyl-group of paraffin or hydrogen at the gamma or more higher position of side chain adjacent to aromatic ring |
| 1.0–2.0 | H$\beta$ | Hydrogen bonding to methylene group at the $\beta$ or more higher position of the side chain adjacent to the aromatic ring or hydrogen bonding to the methylene or methine group of paraffins. Hydrogen bonding to the naphthene compounds or hydrogen bonding to the naphthene ring at the $\beta$ or more higher position adjacent to the aromatic ring |
| 2.0–4.2 | H$\alpha$ | Hydrogen bonding to methyl group of side chain at the alpha position adjacent of |

| Range of δ (ppm) | Symbol | Hydrogen Bonding |
|---|---|---|
| | | aromatic ring. Hydrogen bonding to the methylene or methine group of the side chain at the alpha position adjacent to aromatic ring or hydrogen bonding to the naphthene ring at the alpha position adjacent to aromatic ring |
| 6.2–9.2 | Ha | Hydrogen bonding to aromatic ring |

Four different bonding states of the hydrogen in the sample can be quantitatively estimated as the percentage of the hydrogen content calculated from the respective area corresponding to the aforementioned chemical shift of the proton NMR spectrum. It is also surmised about the average chemical structure unit of CT or CP, QIF-CT or QIF-CP, and hydrogenated oil. (See J. K. Brown and W. R. Landner, Fuel, vol. 39, 79 (1960); Fuel, vol. 39, 87 (1960); Takeya Nenryo Kagaku Kaishi, vol. 43, 837 (1964); R. B. Williams, ASTM STP 224, 168 (1958); J. G. Spreight, Fuel, vol. 49, 76 (1970); Fuel, vol. 50, 102 (1971).

The decrease in aromaticity in the hydrogenation of CT etc. can be quantitatively grasped from the following formula:

$$fa = [C/N - Ha/x - (H\beta + Ha)/y]/(C/H)$$

wherein C/H stands for the carbon/hydrogen atomic ratio. In this case, the parameters x and y can be assumed to be equal to 2 for converting the proton $^1H$ into $^{13}C$.

Example 2

Figure 4:
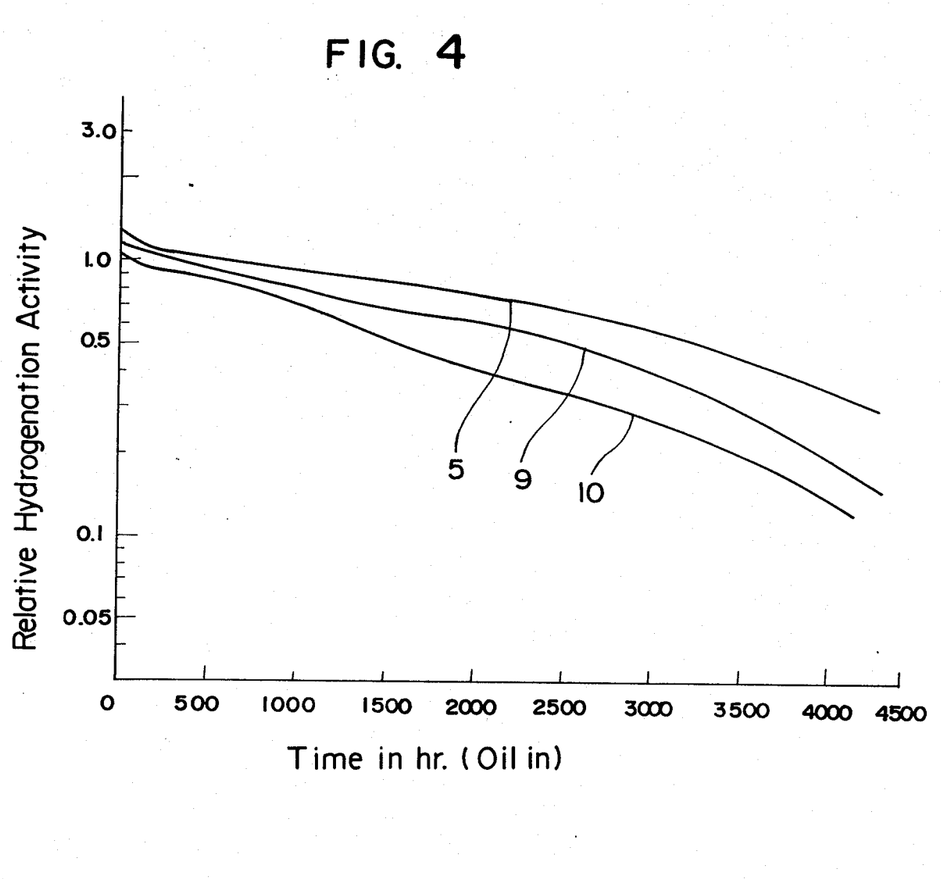
FIG. 4 shows the time dependence change in relative hydrogenation activities of catalysts with respect to NOS. 9 and 10 in the course of hydrogenation of QIF-CP.

Two catalysts (Nos. 9 and 10) having the almost the same mean pore size and pore volume as those of the No. 5 catalyst in the Example 1 and only different therefrom in the pore distribution are used for hydrogen treatment of QIF-CP of the same physical properties as that used in the Example 1. The properties of the catalysts used shown in a tabulated form. The catalytic behavior of the catalysis are also shown in FIG. 4.

Conditions for pre-sulfurization of the catalyst and hydrogenation are the same as those used in Example 1. It may be observed that the catalysts Nos. 5 and 9 are superior to the catalyst No. 10 both in the activity level and the service life.

Example 3

Figure 5:
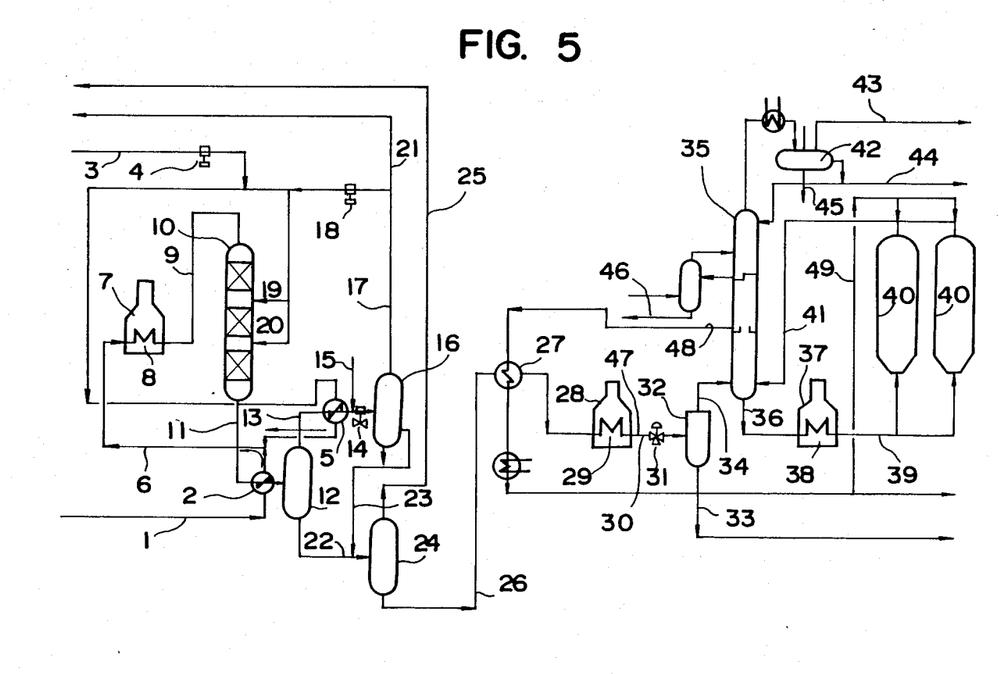
FIG. 5 shows diagrammatically the process flow scheme for the preparation of the SN-coke from hydrogenated oil.

The device for the preparation of the SN-coke as shown in FIG. 5 is used for coking.

In this device, QIF-CP is conveyed through piping 1, heated at 2, elevated in pressure in a compressor 4 via piping 3, united via piping 6 with a hydrogen gas of 99.9% purity which has been heated in a heater 5, the resulting mixture then being heated in a heating furnace 7 to the conditions of the hydrogenation reactor.

The mixture of the heated starting material QIF-CP and the hydrogen gas is conveyed through coil 8 and piping 9 to the top of a hydrogenation reactor 10 to then flow down through catalyst layers. Since the reaction is exothermic, the cold hydrogen gas is supplied in circulation through piping 19 and 20 into the internal between the catalyst layers for quenching and controlling the reactor temperature.

The effluent from the reactor 10 is taken out via piping 11 to be conveyed via preheater 2 to a hot flashing drum 12 where it is divided into gaseous and liquid components.

The heated gas is conveyed through piping 13 and heater 5 to be cooled in an air cooler 14 to then be conveyed to a cold flashing drum 16. The washing water is conveyed via piping 15 to the upstream side of the air cooler 14. The sour water, vapor and liquid components of the hydrocarbon are separated in the cold flashing drum 16.

The recycle gas in conveyed via piping 17 and compressed in a recycle gas compressor 18 to then be united with part of the starting hydrogen so as to be recycled via piping 19, 20, to a reaction zone of the reactor. The hydrogen-rich gas is purged via piping 21 for adjusting the pressure of the reaction system. The liquid products from the cold flashing drum 16 and the hot flashing drum 12 are taken out via piping 22, 23, respectively, and conveyed to a stripper 24 where light cuts or fractions are removed via piping 25.

The hydrogenated oil taken out at the bottom of the stripper 24 is heated at 27 via piping 26 so as to be cracked in a thermal cracking furnace 28 under the conditions mentioned hereinabove. The thermal cracked oil is flashed in a flashing tower 32 via coil 29, piping 30 and a pressure control valve 31. The nonvolatile components are separated and removed from the bottom of the flashing tower 32 via piping 33, whereas light components are supplied via piping 34 to the bottom of the combination tower 35.

The coker drum effluent is supplied to the bottom of the combination tower 35 via piping 41. Both of these components are fractionally distilled with the heavy components being taken out via piping 36 as coker feed so as to be heated in a coil 38 of a coker heating furnace 37 to a temperature sufficient for maintenance of coking reaction and then be supplied via piping 39 to coking drums 40 for delayed coking. These coking drums 40 are driven by rotation on the 24-hour basis.

From the top of the combination tower 35, off-gases (piping 43), light tar oil (piping 44) and waste water (piping 45) are recovered via condenser.

The light cuts are recovered at the piping 46 and separated further into carbolic oil, naphthalene oil and wash oil in a separate system, not shown.

Part of the wash oil is used in a piping 47 for quenching the thermal cracked oil. Part of the heavy oil taken out of the piping 48 is supplied via piping 49 to an effluent line at the top of the coking drum tower so as to be used for quenching.

The present invention will now be explained by referring to practical examples of coking with the use of the above described device.

The QIF-CP with a specific gravity of (15/4° C.) 1.2381; QI, wt. % <0.1; TI, wt. % 9.06; nC7-I, wt. % 19.3; S, wt. % 0.49; N 1.13; fa 0.96; is used as the starting material, and subjected to hydrogenation under the following conditions using the catalyst No. 5 shown in Table 1.

| | Hydrogenation conditions | |
|---|---|---|
| Hydrogen/starting oil | Nl/l | 1000 |
| Reaction temperature | °C. | 360 |
| Reaction pressure | MPa | 17.64 |
| LHSV | hr$^{-1}$ | 1.0 |

The following are the properties of the resulting liquid hydrogenation product.

| Properties of Hydrogenated Oil | |
| --- | --- |
| Specific gravity (15/4° C.) | 1.1668 |
| QI, wt. % | 0 |
| nC7-I wt. % | 10.9 |
| TI, wt. % | 3.85 |
| S, wt. % | 0.11 |
| N, wt. % | 0.79 |
| fa | 0.730 |

It is seen from these results that, with the de-N ratio of 30.1, the hydrogenated oil does not contain QI, but contains both nC7-I and TI. These all components are unexceptionally contained in the heavy portion having the boiling point above 459° C. and said heavy portion accounting for about 48.5 weight percent of the hydrogenated oil (nC7-I; wt. % 23.5; TI, wt. %, 7.36. Despite the fact that the de-N ratio is 30.1 percent, neither nC7-I nor TI components are removed by hydrogenation.

Then, the hydrogenated oil is fed as such to a thermal cracking tube where it is thermal cracked at a pressure of 2.45 MPa (25 kg/cm$^2$G) and temperature of 500° C. (with cold residence time of 130 seconds). The oil is then fed to a flashing tower maintained at 500° C. and atmospheric pressure. The non-volatile components are then removed from the tower bottom, whereas the light boiling components with the boiling point lower than 300° C. are removed from the hydrogenated oil produced upon cooling the vapor at the tower top. The remaining oil is used as the starting coking material with the following properties.

| Properties of the Starting Coking Material | |
| --- | --- |
| Specific gravity (15/4° C.) | 1.1134 |
| QI, wt. % | 0 |
| nC7-I, wt. % | 0.0 |
| TI, wt. % | 0 |

The starting coking material thus obtained is subjected to delayed coking for 24.0 hours under a temperature of 455° C., a pressure of 0.637 MPa (6.5 kg/cm$^2$G) and a reflux ratio of 0.7.

After the oil is charged for delayed coking, steam purging is carried out as conventionally. Then, the green coke is recovered. The yield of the green coke is 30 wt. % with respect to the starting material, with the VCM contents being 9.0 percent.

The green coke is then calcined as conventionally at 1400° C. for 1.0 hour and crushed and pulverized. The pitch was then added as binder and kneaded to the resulting product. The kneaded mixture was then extruded and made in the form of an extrusion rod, baked at 1000° C. and graphitized at 2700° C. resulting in graphite artifact. The following are the physical properties of the calcined and graphite artifact.

| Coke Properties | |
| --- | --- |
| Calcined coke | |
| Real density, (15/4° C.) g/cc | 2.152 |
| Graphite artifact | |
| CTE (w.g.) × 10$^{-6}$/°C. | 0.83 |
| Magnetoresistance (MR), % | 13.2 |
| Flexural strength, MPa | 13.4 |
| Young's Modulus, kg/cm$^2$ | 80.85 |

It is seen from the above Table that the calcined coke thus obtained has the real density higher than 2.15 and notably low CTE, extremely high MR, good graphitizability and an extremely low Young's modulus of graphite artifact. These properties are favorable in comparison with the Young's modulus of 86.24 to 98 MPa (880 to 1000 kg/mm$^2$) or higher of the graphite artifact derived from the petroleum sources having the same order or magnitude of CTE as the aforementioned inventive product.

Then, for measuring dynamic puffing (DP) the coke calcined as described hereinabove is crushed and sieved out the fractions with the particle size distribution in the range from 35 to 65 meshes and in the range less than 200 meshes, respectively. Then, a sample mixture consisting of 67 weight percent of the 35 to 65 mesh size portions and 33 weight percent of less than 200 mesh size portions was molded with addition of a suitable amount of the binder pitch (under the pressure of 86.1 MPa) to a mold plug with an I.D. equal to 4 inches. From this mold plug is then cut out a plug element with 1 inch I.D. and 1 inch long.

After the plug size is measured in advance with a micrometer, the plug element is set on a dilatometer and the changes in size are measured over the temperature range of 1200° C. to 2700° C. at the temperature rising rate of 14° C. per minute for measuring the dynamic puffing (DP). The DP value ($\Delta L\%$, the difference between $\Delta L\%$ at the maximum temperature and $\Delta L\%$ at minimum temperature; $\Delta L\%$, the percentage of change in length vs temperature) amounts to negative percent in the present embodiment, which may be said not to represent the puffing.

The yield of the non-volatile components from the flasher is 18.7 weight percent, with the QI components being less than 0.1 weight percent.

Example 4

The procedure of Example 1 is followed except that the temperatures of 440° C. (A), 450° C. (B), 455° C. (C), 465° C. (D) and 470° C. (E) are used instead of the coking temperature of 460° C. The results are shown in the Table below.

| | Coke Properties | | |
| --- | --- | --- | --- |
| Run No. | Green Coke VCM, wt. % | Graphite Artifact CTE, × 10$^{-6}$/°C. | MR, % |
| A | 16.5 | 0.77 | 13.8 |
| B | 12.0 | 0.84 | 13.4 |
| C | 10.3 | 0.85 | 13.6 |
| * | 8.2 | 0.83 | 13.2 |
| D | 8.0 | 0.94 | 3.1 |
| E | 7.0 | 1.02 | 13.0 |

* Data of Example 4

In the above Table, A, B and C represent the case in which the coking temperatures of 440° C., 450° C. and 455° C. are used for the starting coking material of the Example 1. Because of the slow coking rate of the starting coking material, delayed coking for 24 hours is not enough for the material to be coked entirely into the state of the green coke.

For this reason, the VCM of the green coke is fluctuated considerably in the coke drum with its mean value becoming higher than 10 weight percent thus not satisfying the requirements for VCM content of the super needle coke.

At the middle and upper portions of the coke drum, however, the green coke were formed, thus this coke portion is cut out and CTE and MR are measured.

Hence, although these A, B and C samples are not industrially practicable under these coking temperature conditions; it has been shown that the undesirable component for SN-coke formation have been removed.

Example 5

The procedure of the Example 4 is repeated except that the following hydrogenation conditions are used instead of those shown in Example 4.

| Hydrogenation Conditions | | |
|---|---|---|
| Hydrogen/starting oil | Nl/l | 1000 |
| Reaction temperature | °C. | 360 |
| Reaction pressure | MPa | 4.9 |
| | (kg/cm$^2$G) | (50) |
| LHSV | hr$^{-1}$ | 0.75 |

The following are the properties of the resulting hydrogenated oil and the starting coking material (de-N ratio, 15%).

| Properties of Hydrogenated Oil and Starting Coking Material | | |
|---|---|---|
| | Hydrogenated oil | Starting coking Material |
| Specific gravity 15/4° C. | 1.1922 | 1.1552 |
| QI, wt. % | 0 | 0 |
| nC7-I, wt. % | 14.9 | 0.50 |
| TI, wt. % | 5.40 | 0 |
| S, wt. % | 0.19 | — |
| N, wt. % | 0.96 | — |

CTE(W.G.) and MR of the graphite artifact are $1.08 \times 10^{-6}$/°C. and 12.2 percent, respectively, and thus comparable with those of the PN-coke. the DP (ΔL %) value is +0.08

Example 6

The hydrogenated oil samples F, G, H and I with different de-N rates are prepared by changing solely the hydrogenation conditions of the Example 4. The graphite artifact are ultimately prepared by otherwise repeating the procedure of the Example 4. The characteristics of these samples are as shown below:

| | Coke Properties | | | |
|---|---|---|---|---|
| de-N ratio % | | CTE × 10$^{-6}$/°C. | MR % | Young's Modulus MPa |
| F | 23.1 | 0.91 | 13.0 | 72.52 |
| * | 34.5 | 0.83 | 13.2 | 80.85 |
| G | 37.6 | 0.84 | 13.4 | 84.28 |
| H | 42.5 | 0.85 | 14.0 | 88.2 |
| I | 76.1 | 0.78 | 13.8 | 110.74 |

*: Data of Example 4

The Young modulus values of the test samples F to I are abnormally high and undesirable. However, both the CTE and MR values of these samples are those of the super needle coke. The lower the de-N ratio, larger the MR value, and CTE values are almost the same which is desirable.

COMPARATIVE EXAMPLE

The starting oil (CT) having the following properties with a specific gravity, 15/4° C. 1.1452; QI, wt. % <0.1; TI wt. % 3.48; nC-7-I, wt. % 11.0; S, wt. % 0.44 and N, wt. % 0.98 is used and directly subjected to thermal cracking without hydrogen treatment such as is carried out in the Example 4. The oil is thermal cracked at 480° C. and under the pressure 2.45 MPa(25 kg/cm$^2$G), and fed to a flasher maintained at 480° C. under a atmospheric pressure. The non-volatile components are removed from the bottom, while the distillate are removed at the top from which starting coking material was obtained. The properties of the oil samples are as shown in the Table below.

| Properties of Starting Coking Material | |
|---|---|
| Specific Gravity, 15/4° C. | 1.1638 |
| QI, wt. % | 0.1 |
| nC7-I, wt. % | 3.2 |
| TI, wt. % | 0.2 |
| S, wt. % | 0.66 |
| N, wt. % | 1.10 |

These oil samples are then subjected to delayed coking under five temperature conditions of 440°, 450°, 455°, 460° and 465° C. for samples J, K, L, M and N, respectively, with the pressure of 0.29 MPa (3 kg/cm$^2$G), and the processing hereafter is then carried out as in Example 4.

| Coking Conditions and Coke Properties | | | | | |
|---|---|---|---|---|---|
| Run No. | J | K | L | M | N |
| Coking Temperature, °C. | 440 | 450 | 455 | 460 | 465 |
| Green Coke | | | | | |
| VCM, wt. % | 16.4 | 10.0 | 9.7 | 8.3 | 7.0 |
| Graphite Artifact | | | | | |
| CTE, × 10$^{-6}$/°C. | 0.93 | 1.06 | 1.17 | 1.20 | 1.43 |
| MR, % | 12.0 | 11.1 | 10.7 | 10.1 | 19.8 |

Similarly to the Example 6, the CTE and MR of the samples J and K in the above Table are measured on the samples taken out of the coke drum of which the extremely high VCM contents were previously removed.

The VCM of the samples L, M and N were lower than 10 wt. percent, while the CTE values of L and M were in the range of those of the RN-coke grade and the MR values were also low.

It is seen that the CTE of N does not fall under that of the RN-coke. The difference between the CTE values of J and N is extremely high and equal to 0.5, which means that the thermal cracking and the subsequent flasher treatment without hydrogenation are not enough to remove a certain undesirable component for SN-coke from the starting coking material.

Since the S and N contents in the starting coking material are not changed from the S and N contents in the starting material, the de-S and de-N effect is not to be expected from thermal cracking. The DP (ΔL%) for K amounts to +0.24%.

Example 7

280° C.-heavier fraction of the hydrogenated oil in Example 4 having the following properties (Specific Gravity, 15/4° C. 1.1219; QI, wt. % 0.1: TI, wt. % 3.76; nC7-I, wt. % 12.0: S, wt. % 0.11; N, wt. % 0.75) was directly subjected delayed coking at the temperature of 450° C. and under the pressure of 0.29 MPa and others were carried out in accordance with Example 4. The results are shown in the Table below.

| Coke Properties | |
| --- | --- |
| Green Coke | |
| Vem, wt. % | 9.0 |
| Graphite Artifact | |
| CTE, × 10⁻⁶/°C. | 1.11 |
| MR, % | 11.5 |

TABLE 1

| Catalyst No. | 1 | 2 | 3 | 4 | 5 | 6 | 7 | 8 | 9 | 10 |
| --- | --- | --- | --- | --- | --- | --- | --- | --- | --- | --- |
| catalyst composition | | | | | | | | | | |
| $MoO_3$ | 19.8 | 19.5 | 19.8 | 19.1 | 20.5 | 14.9 | 19.7 | 10.6 | 19.8 | 19.9 |
| NiO | 4.3 | 4.7 | 4.1 | 4.3 | 4.2 | 0.0 | 4.5 | 0.7 | 4.2 | 4.3 |
| SiO | 0.4 | 0.4 | 0.5 | 0.4 | 0.4 | 0.5 | 0.3 | 0.1 | 0.3 | 0.5 |
| $SO_4$ | 0.9 | 0.5 | 1.0 | 0.5 | 0.7 | 0.0 | 0.5 | 0.0 | 0.5 | 0.4 |
| CoO | 0.0 | 0.0 | 0.0 | 0.0 | 0.0 | 4.4 | 0.0 | 1.2 | | |
| Physical properties | | | | | | | | | | |
| mean pore size nm | 5.2 | 6.3 | 8.0 | 9.8 | 13.5 | 15.4 | 19.1 | 11.8 | 13.5 | 13.5 |
| pore surface m²/g | 250 | 218 | 195 | 184 | 146 | 137 | 112 | 215 | 151 | 145 |
| specific volume cc/g | 0.326 | 0.343 | 0.387 | 0.450 | 0.495 | 0.524 | 0.525 | 0.632 | 0.150 | 0.490 |
| pore size distribution cc/g | | | | | | | | | | |
| 3.5–5.0 nm | 0.160 | 0.040 | 0.002 | 0.000 | 0.007 | 0.000 | 0.002 | 0.011 | 0.021 | 0.018 |
| 5.0–8.0 nm | 0.155 | 0.272 | 0.158 | 0.032 | 0.016 | 0.006 | 0.005 | 0.036 | 0.034 | 0.053 |
| 8.0–18.0 nm | 0.010 | 0.031 | 0.215 | 0.410 | 0.375 | 0.418 | 0.177 | 0.550 | 0.263 | 0.192 |
| 18.0–30.0 nm | 0.000 | 0.000 | 0.012 | 0.004 | 0.087 | 0.090 | 0.262 | 0.014 | 0.133 | 0.137 |
| more than 30 nm | 0.000 | 0.000 | 0.000 | 0.004 | 0.010 | 0.010 | 0.079 | 0.021 | 0.059 | 0.090 |

What is claimed is:

1. A method of hydrogen treatment of coal tar or coal tar pitch, characterized in that the hydrogen treatment is carried out at a hydrogen pressure of 40–180 kg/m²G, a temperature of 300°–420° C. and a liquid hourly space velocity of 0.2–2 hr⁻¹ using a catalyst comprised of a first catalytic component containing Mo and a second catalytic component containing Ni and/or Co carried on a substrate, the contents of the first and second catalytic components in said catalyst being about 10–30% by weight and about 1–6% by weight, respectively in terms of metal oxide, and said catalyst having the following physical properties with regard to its pores with a pore diameter of more than 3.5 nm:

(a) an average pore diameter APD being 9.8–15.4 nm;
(b) a total pore volume PV being 0.450–0.632 cc/g;
(c) a surface area SA being 137–215 m²/g;
(d) a pore size distribution as follows:

| pore diameter (nm) | specific volume (cc/g) |
| --- | --- |
| 3.5–5 | less than 0.1 |
| 5–8 | less than 0.3 |
| 8–18 | 0.2–0.55 |
| 18–30 | less than 0.2 |
| over 30 | less than 0.1; and |

(e) a ratio of the volume of pores with diameters of 8–18 nm to the total pore volume PV being 0.758–0.911.

* * * * *